(12) United States Patent
Kuliner (10) Patent No.: US 7,738,471 B2
(45) Date of Patent: Jun. 15, 2010

(54) HIGH SPEED PACKET PROCESSING IN A WIRELESS NETWORK

(75) Inventor: Mitel Kuliner, Rochester, NY (US)

(73) Assignee: Harris Corporation, Melbourne, FL (US)

(*) Notice: Subject to any disclaimer, the term of this patent is extended or adjusted under 35 U.S.C. 154(b) by 402 days.

(21) Appl. No.: 11/855,714

(22) Filed: Sep. 14, 2007

(65) Prior Publication Data

US 2009/0074009 A1 Mar. 19, 2009

(51) Int. Cl.
*H04L 12/56* (2006.01)
*H04J 1/16* (2006.01)

(52) U.S. Cl. .................. 370/412; 370/352; 370/389; 370/401

(58) Field of Classification Search ......... 370/352–356, 370/400, 401, 389, 412
See application file for complete search history.

(56) References Cited

U.S. PATENT DOCUMENTS

| | | | |
|---|---|---|---|
| 6,658,480 B2* | 12/2003 | Boucher et al. | 709/239 |
| 6,963,586 B2 | 11/2005 | Henriksson et al. | |
| 7,328,283 B2* | 2/2008 | Tan et al. | 709/247 |
| 2001/0037397 A1* | 11/2001 | Boucher et al. | 709/230 |
| 2001/0053148 A1 | 12/2001 | Bilic et al. | |
| 2002/0136202 A1 | 9/2002 | Droz et al. | |
| 2002/0147839 A1 | 10/2002 | Boucher et al. | |
| 2006/0104303 A1 | 5/2006 | Makineni et al. | |
| 2007/0005925 A1 | 1/2007 | Burkley et al. | |
| 2007/0006293 A1 | 1/2007 | Balakrishnan et al. | |

\* cited by examiner

*Primary Examiner*—John Pezzlo
(74) *Attorney, Agent, or Firm*—Fox Rothschild, LLP; Robert J. Sacco (57) ABSTRACT

A method is provided for processing a packet (300) at an egress end user node (110). The method includes a decoding step and a concurrent writing step. The concurrent writing step is performed subsequent to the decoding step. The decoding step involves decoding a packet having a plurality of headers (306-314). The concurrent writing step involves concurrently writing each of the headers (306-314) to a packet buffer memory (122) and a respective protocol stack layer memory (126-134). More specifically, a MAC layer protocol header (306) is concurrently written to the packet buffer memory and a MAC layer memory (126). An LLC layer protocol header (308) is concurrently written the packet buffer memory and an LLC layer memory (128). A network layer protocol header (310) is concurrently written to the packet buffer memory and a network layer memory (130), and so on.

22 Claims, 5 Drawing Sheets

HIGH SPEED PACKET PROCESSING IN A WIRELESS NETWORK

BACKGROUND OF THE INVENTION

1. Statement of the Technical Field

The inventive arrangements relate to wireless networks. More particularly, the present invention relates to a method and apparatus for high speed protocol header processing at an intermediate and/or destination node of a packet-based communications network.

2. Description of the Related Art

There has been a growing demand for improved communication applications provided by packet-based communications networks. The phrase "packet-based communications network" as used herein refers to an internet protocol (IP) based communications network and a transmission control protocol/internet protocol (TCP/IP) based communications network. As a result the growing demand, a header processing approach has been employed to improve the abilities of the packet-based communications networks. The header processing approach includes the transmission of packets including signaling protocol data and/or application data between nodes of the packet-based communications networks. The application data can include voice data, video data, or the like. The nodes can be selected as a computer system, a routing device, a sensor, a battery powered wireless communications device, or any other device having a TCP/IP based packet interface.

To enable the transmission of packets between a set of nodes, the application data is encapsulated between one or more protocol stack layer headers and a frame check sequence (FCS). The phrase "frame check sequence" as used herein refers to extra checksum characters added to a packet or a frame in a communication protocol for error detection and correction. In this regard, it should be understood that a checksum is a form of a redundancy check. A checksum protects the integrity of data by detecting errors in the data that are sent through space or time.

For example, the application data is encapsulated between an application layer header (or protocol header) and the frame check sequence (FCS). The application layer header is encapsulated between a transport layer protocol header and the application data. The transport layer protocol header is encapsulated between a network layer protocol header and the application layer header. The network layer protocol header is encapsulated between a logic link control (LLC) layer protocol header and the transport layer protocol header. The logic link control (LLC) layer protocol header is encapsulated between a media access control (MAC) layer protocol header and the network layer protocol header. The media access control (MAC) layer protocol header is encapsulated between a physical layer protocol header and the logic link control (LLC) protocol header. The physical layer protocol header is encapsulated between a preamble and the media access control (MAC) layer protocol header. As should be understood, the encapsulation framework depends on the network's protocol model, such as an open system interconnection model or a Department of Defense protocol model. The protocol headers are comprised of fields to be processed at intermediate and/or destination nodes. Some protocol headers have long fields that require a comparison among several values. As such, a packet transmission often experiences relatively long delays due to protocol header processing at intermediate and/or destination nodes.

Many solutions have been proposed for decreasing the protocol header processing time at intermediate and/or destination nodes of a packet-based communications networks. One such solution employs a sequential processing approach. The sequential processing approach involves receiving an encoded packet at a node, decoding the received encoded packet, and processing protocol headers of the decoded packet in a sequential manner. In this regard, it should be noted that the sequential processing approach is dependent on methods to advance the protocol header processing from one protocol header to a next protocol header. This solution is based on either specialized processors configured for processing a particular protocol header and/or a general purpose central processing unit (CPU).

More specifically, the sequential processing approach includes the following steps: (1) receive a packet at an intermediate and/or a destination node; (2) decode the received packet at a physical layer processor; (3) process a preamble and a physical layer protocol header of the decoded packet at the physical layer processor; (4) sequentially write a media access control (MAC) layer protocol header, a logic link control (LLC) layer protocol header, a network layer protocol header, a transport layer protocol header, an application layer header, and an application data to a packet buffer memory for storage; (5) access the packet buffer memory and retrieve the media access control (MAC) layer protocol header therefrom; (6) process the media access control (MAC) layer protocol header at a media access control (MAC) layer processor; (7) access the packet buffer memory and retrieve the logic link control (LLC) layer protocol header therefrom; (8) process the logic link control (LLC) layer protocol header at a logic link control (LLC) layer processor; (9) access the packet buffer memory and retrieve the network layer protocol header therefrom; (10) process the network layer protocol header at a network layer processor; (11) access the packet buffer memory and retrieve the transport layer protocol header therefrom; (12) process the transport layer protocol header at a transport layer processor; (13) access the packet buffer memory and retrieve the application layer header therefrom; and (14) process the application layer header at an application layer processor. Despite the advantages of the sequential processing approach, it suffers from certain drawbacks. For example, the majority of protocol header processing tasks are implemented in software as generic packet processing methods.

Another such solution employs fixed function applications specific integrated circuits (ASICs) and field programmable gate arrays (FPGAs). Despite the advantages of such fixed function devices, they suffer from certain drawbacks. For example, the fixed function devices cannot handle updating processing header fields. Further, the fixed function devices always defer protocol header processing to a general purpose processor. The general purpose processor cannot operate at a desired speed for a battery powered wireless communications device. The general purpose processor also cannot accommodate changes in timing needs due to high speed, very high bandwidth data traffic.

In view of the forgoing, there is a need for a solution to reduce protocol header processing time in a packet-based communications networks. This solution also needs to be configured to update header fields. The solution further needs to be configured to process protocol headers at a desired speed for a battery powered wireless communications device. In this regard, it should be understood that a battery powered wireless communications device can be a node in a high speed wireless communications system. As such, the battery powered wireless communications device can concurrently act as an intermediate node and a destination node. As such, the roles of the battery powered wireless communications device can alternate and vary based on time or traffic conditions.

SUMMARY OF THE INVENTION

The invention concerns a method for processing a packet at an egress end user node. The method includes a decoding step and a concurrent writing step. The decoding step involves decoding a packet having a plurality of headers. The concurrent writing step is performed subsequent to the decoding step. The concurrent writing step involves concurrently writing (1) each of the headers to a packet buffer memory and (2) each individual one of the headers to a respective protocol stack layer memory where it is available for immediate processing within a protocol stack layer.

According to an aspect of the invention, at least one of the headers is a media access control layer protocol header and the respective protocol stack layer memory is a media access control layer memory. At least one of the headers is a logic link control layer protocol header and the respective protocol stack layer memory is a logic link control layer memory. At least one of the headers is a network layer protocol header and the respective protocol stack layer memory is a media access control layer memory. At least one of the headers is a network layer protocol header and the respective protocol stack layer memory is a network layer memory. At least one of the headers is a transport layer protocol header and the respective protocol stack layer memory is a transport layer memory. At least one of the headers is an application layer header and the respective protocol stack layer memory is an application layer memory.

According to another aspect of the invention, the method includes concurrently processing the headers in each of a plurality of protocol stack layers. The method also includes communicating a portion of the packet to a direct memory access (DMA) device subsequent to the decoding step and prior to the concurrent writing step. The portion of the packet is absent of a preamble and a physical layer header. The method further includes communicating a physical layer header to a physical layer memory where it is available for immediate processing within a physical layer. This communicating step is performed subsequent to the decoding step. The concurrent writing step is performed within a physical layer utilizing a direct memory access (DMA) device.

An egress end user node (EEUN) of a packet based communications system is also provided. The EEUN is comprised of a decoder and a direct memory access (DMA) device. The decoder is configured to decode a packet having a plurality of headers. The DMA device is coupled to the decoder. The DMA device is configured to concurrently write (1) each of the headers to a packet buffer memory and (2) each individual one of the headers to a respective protocol stack layer memory where it is available for immediate processing within a protocol stack layer.

According to an aspect of the invention, at least one of the headers is a media access control layer protocol header and the respective protocol stack layer memory is a media access control layer memory. At least one of the headers is a logic link control layer protocol header and the respective protocol stack layer memory is a logic link control layer memory. At least one of the headers is a network layer protocol header and the respective protocol stack layer memory is a media access control layer memory. At least one of the headers is a network layer protocol header and the respective protocol stack layer memory is a network layer memory. At least one of the headers is a transport layer protocol header and the respective protocol stack layer memory is a transport layer memory. At least one of the headers is an application layer header and the respective protocol stack layer memory is an application layer memory.

According to another aspect of the invention, the decoder is configured to communicate a portion of the packet to the DMA device subsequent to decoding the packet. The portion of the packet is absent of a preamble and a physical layer header. The decoder is also configured to communicate a physical layer header to a physical layer memory where it is available for immediate processing within a physical layer. The decoder is configured to communicate the physical layer header to the physical layer memory subsequent to decoding the packet.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
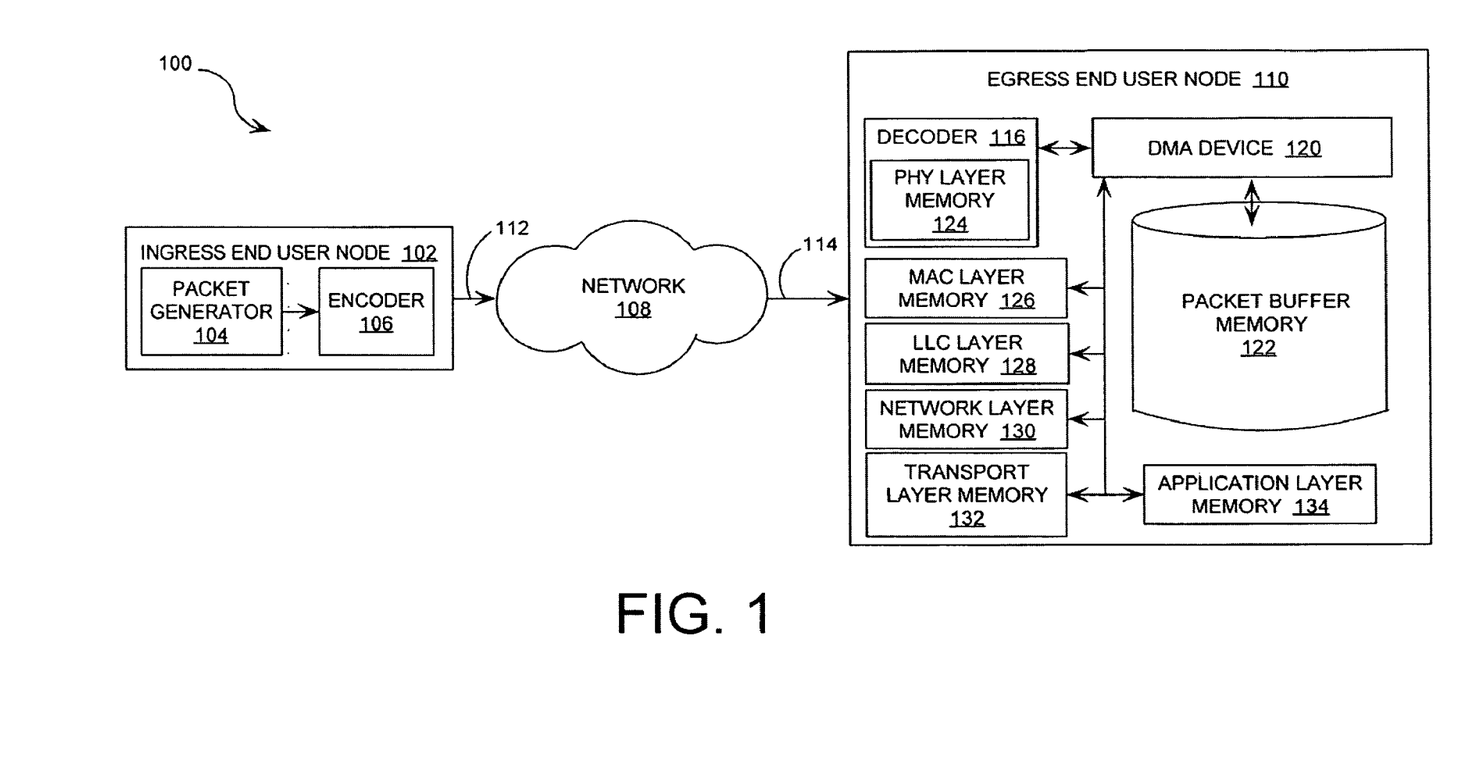
FIG. 1 is a block diagram of a packet-based communications system that is useful for understanding the present invention.

FIG. 1 is a block diagram of a packet-based communications system 100. The packet-based communications system 100 is comprised of an ingress end user node (IEUN) 102, a network 108, and an egress end user node (EEUN) 110. The IEUN 102 is a source of a plurality of packets including data packets and signaling packets. The IEUN 102 can be a source computer system, a routing device, a sensor, a battery powered wireless communications device, or any other device having a TCP/IP based packet interface.

As shown in FIG. 1, the IEUN 102 is comprised of a packet generator 104 and an encoder 106. The packet generator 104 is configured to generate a packet. The packet generator 104 is also configured to forward packets to the encoder 106. The encoder 106 performs actions involving the encoding of packets for enabling an efficient transmission of the packets over a network link 112, 114.

The IEUN 102 is electrically or optically connected to the network 108 via the network link 112. As such, the IEUN 102 performs actions involving the communication of encoded packets to the network 108. The network 108 is a packet-based communication network. The phrase "packet-based communications network" as used herein refers to an internet protocol (IP) based communications network and a transmission control protocol/internet protocol (TCP/IP) based communications network. The network 108 is electrically or optically connected to the EEUN 110 via a network link 114. The EEUN 110 is an intermediate or destination node. If the EEUN 110 is a destination node, then the EEUN 100 is the destination of a plurality of packets in a network. The EEUN 110 can be a destination computer system, a routing device, a battery powered wireless communications device, or any other device having a TCP/IP based packet interface.

As shown in FIG. 1, the EEUN 110 is comprised of a decoder 116, a direct memory access (DMA) device 120, and a packet buffer memory 122. The EEUN 110 is also comprised of a media access control (MAC) layer memory 126, a logic link control (LLC) layer memory 128, a network layer memory 130, a transport layer memory 132, and an application layer memory 134. The decoder 116 is configured to receive an encoded packet from the network 108. Upon receipt of the encoded packet, the decoder 116 performs actions involving the decoding of the encoded packet for placing the same in a form that is readable to a particular computer program installed on the EEUN 110. In this regard, it should be appreciated that the decoder 116 is comprised of a physical layer memory 124. The physical layer memory 124 is provided for storing a portion of a decoded packet including preamble and physical layer information. The decoder 116 is also configured to advantageously forward a portion of a decoded packet that is absent of preamble and physical layer information to the DMA device 120.

The following discussion is provided to generally describe the DMA device 120. In this regard, it should be understood that, in general, there is no direct path from a peripheral device to a main memory space of a communications system. As such, the only way to transfer data between the peripheral's memory and main memory is for the central processing unit (CPU) to read the data from the peripheral's memory and write the data to the main memory space for storage, or vice versa. Some peripheral devices are able to transfer data to and from the main memory without passing the data through the CPU. This operation is called direct memory access (DMA) and is handled by a dedicated integrated circuit known as a DMA device. The general purpose of a DMA device is to allow peripheral devices to read or write data without involving a CPU.

In general, the DMA device 120 has programming registers for multiple memory transfers. The programming registers are also referred to as DMA channels. In order to choose and uniquely identify a single transfer, a DMA channel is programmed for performing actions to read data from a memory device, to write data to a memory device, to obtain an address for a source memory device, to obtain an address for a destination memory device, and/or to obtain a memory length. The DMA device 120 can also service multiple DMA channels and perform multiple data transfers.

In a conventional EEUN, a packet is transferred from a MAC layer memory to a CPU main memory through a serial or parallel memory transfer performed by a CPU. The CPU main memory space used for the packet transfer is known as the packet buffer memory 122. Each of the protocol stack layers use the packet buffer memory 122 to copy it's respective header into its own processing memory for receive processing. Each of the protocol stack layers writes its header to the packet buffer memory 122 when transmit processing is completed.

Some conventional EEUN architectures do include one or more DMA devices. However, the DMA devices are provided only for a one time transfer of a packet from the MAC layer memory to a CPU main memory. As will be appreciated, this single transfer does not solve or deal with the varying latencies and the increased processing consequences present in a high speed wireless network.

In order to solve this problem, a DMA device is used to concurrently write the specific layer header fields directly into: (a) each protocol stack layer's internal memory spaces 126, . . . , 134 to initiate immediate processing; and (b) the packet buffer memory 122. This arrangement provides what is essentially a cross layer architecture framework. This approach facilitates a high data transfer rate by allowing the exchange of information between the protocol stack layers. In doing so, it reduces processing latency and thereby increases bandwidth.

Referring again to FIG. 1, the DMA device 120 is configured to process a received portion of a decoded packet. In this regard, it should be appreciated that the DMA device 120 performs actions involving directly accessing the packet buffer memory 122, the media access control (MAC) layer memory 126, the logic link control (LLC) layer memory 128, the network layer memory 130, the transport layer memory 132, and the application layer memory 134. The DMA device 120 is also configured to concurrently communicate data to the packet buffer memory 122, the media access control (MAC) layer memory 126, the logic link control (LLC) layer memory 128, the network layer memory 130, the transport layer memory 132, and the application layer memory 134. The DMA device 120 allows the transfer of data to these various memory locations in a single DMA transaction.

The following discussion is provided to describe how the DMA device concurrently communicates data to the different memories 122, 126, . . . , 134. In this regard, it should be understood that the DMA device 120 is configured to allow each of the protocol stack layers to concurrently begin header processing without having to wait for one or more other protocol stack layer's to complete its header processing. For example, respective headers of a packet are concurrently processed in the MAC layer, the LLC layer, the network layer, the transport layer and the application layer.

According to an embodiment of the invention, the DMA device 120 is configured to temporarily store headers from a MAC layer, the LLC layer, the network layer, the transport layer and an application layer in a memory internal to the DMA device 120. The DMA is device is also configured to temporarily store payload data in a memory internal to the DMA device 120. Thereafter, the DMA device 120 performs actions to concurrently write the headers and payload to the packet buffer memory 122 and at least one of the MAC layer memory 126, the LLC layer memory 128, the network layer memory 130, the transport layer memory 132, and the application layer memory 134. Still, the invention is not limited in this regard.

Those skilled in the art will appreciate that the packet based communications system 100 architecture illustrated in FIG. 1 is one possible example of a packet based communications system. However, the invention is not limited in this regard and any other suitable packet based communications system architecture can also be used without limitation.

Figure 2:
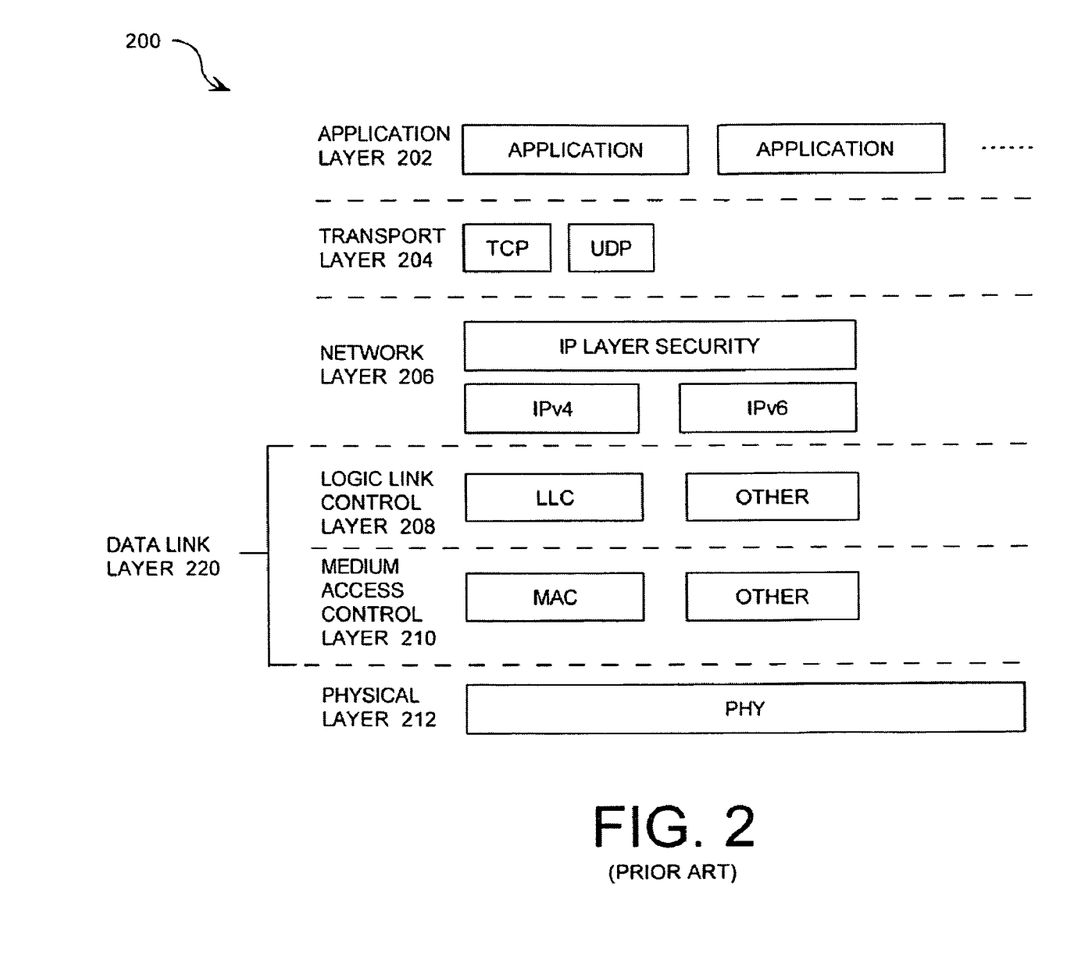
FIG. 2 is a protocol stack for the packet-based communications system of FIG. 1 that is useful for understanding the present invention.

Referring now to FIG. 2, there is provided a protocol stack for the packet-based communications system 100 of FIG. 1. According to the embodiment shown in FIG. 2, the protocol stack 200 includes five layers 202, 204, 206, 220, 212 specifying particular functions of the packet-based communications system 100. Still, the invention is not limited in this regard. The protocol stack 200 can include any number of layers in accordance with a particular packet-based communications system application. For example, if an open system interconnection (OSI) protocol stack is employed by the packet-based communications system 100 then the protocol stack 200 can further include a session layer and a presentation layer.

Referring again to FIG. 1, the protocol stack 200 provides a framework illustrating how information is passed from a software application installed in the IEUN 102 (described above in relation to FIG. 1) to a software application installed in the EEUN 110 (described above in relation to FIG. 1). The protocol stack 200 is well known to persons skilled in the art. Thus, the protocol stack 200 will not be described in detail herein. However, a brief discussion is provided below to assist a reader in understanding direct memory access (DMA) write operations (described below in relation to FIG. 4).

Referring again to FIG. 2, the protocol stack 200 is comprised of a physical layer 212, a data link layer 220, a network layer 206, a transport layer 204, and an application layer 202. The physical layer 212 is comprised of firmware and/or hardware configured to send and receive data through a network 108 (described above in relation to FIG. 1). The data link layer 220 provides transmission protocols for transferring data between network 108 nodes. Such transmission protocols can include an Ethernet protocol (or an IEEE802.3 protocol), a point-to-point protocol, an IEEE802.11 protocol, an IEEE802.15 protocol, an IEEE802.16 protocol, and other such protocols.

As shown in FIG. 2, the data link layer 220 can be comprised of two (2) sub-layers, namely a logic link control (LLC) layer 208 and a media access control (MAC) layer 210. The logic link control (LLC) layer 208 is comprised of firmware and/or hardware configured to multiplex protocols prior to being transmitted over the media access control (MAC) layer 210 and to demultiplex protocols subsequent to being transmitted and upon receipt. The logic link control (LLC) layer 208 is also comprised of firmware and/or hardware configured to provide flow control of packets, detection of packets, and retransmission of dropped packets.

The media access control (MAC) layer 210 is comprised of firmware and/or hardware configured to determine when to transmit communications and when to receive communications. In this regard, the media access control (MAC) layer 210 performs actions involving coordinating access to a shared radio channel and utilizing protocols that enhance communications over a wireless link 112, 114 (described above in relation to FIG. 1). The term "protocol" as used herein refers to a set of rules defining how information is exchanged between network nodes. Such network nodes include, but are not limited to, the IEUN 102 (described above in relation to FIG. 1) and the EEUN 110 (described above in relation to FIG. 1). The media access control (MAC) layer 210 provides transmission protocols for transferring data between network 108 nodes. Such transmission protocols include media access control (MAC) protocols. Media access control (MAC) protocols ensure that signals sent from different nodes across the same channel do not collide.

The network layer 206 is comprised of firmware configured to transfer data from one node to another node. In this regard, the network layer 206 provides protocols for transferring data from one node to another node. The transmission protocols include routing protocols and forwarding protocols. Such transmission protocols include internet protocols, such as a version four (4) of the internet protocol (IPv4), a version six (6) of the internet protocol (IPv6), and internet security protocols (IP Layer Security).

The transport layer 204 is comprised of firmware configured to communicate data between end systems. In this regard, the transport layer 204 provides transport protocols for transmission of data between end systems. Such transport protocols include a transmission control protocol (TCP) and a user datagram protocol (UDP). The application layer 202 is generally implemented only in firmware. The application layer 202 provides signaling protocols for end-user applications, such as authentication applications, data syntax applications, quality of service applications, and end-user applications.

Figure 3:
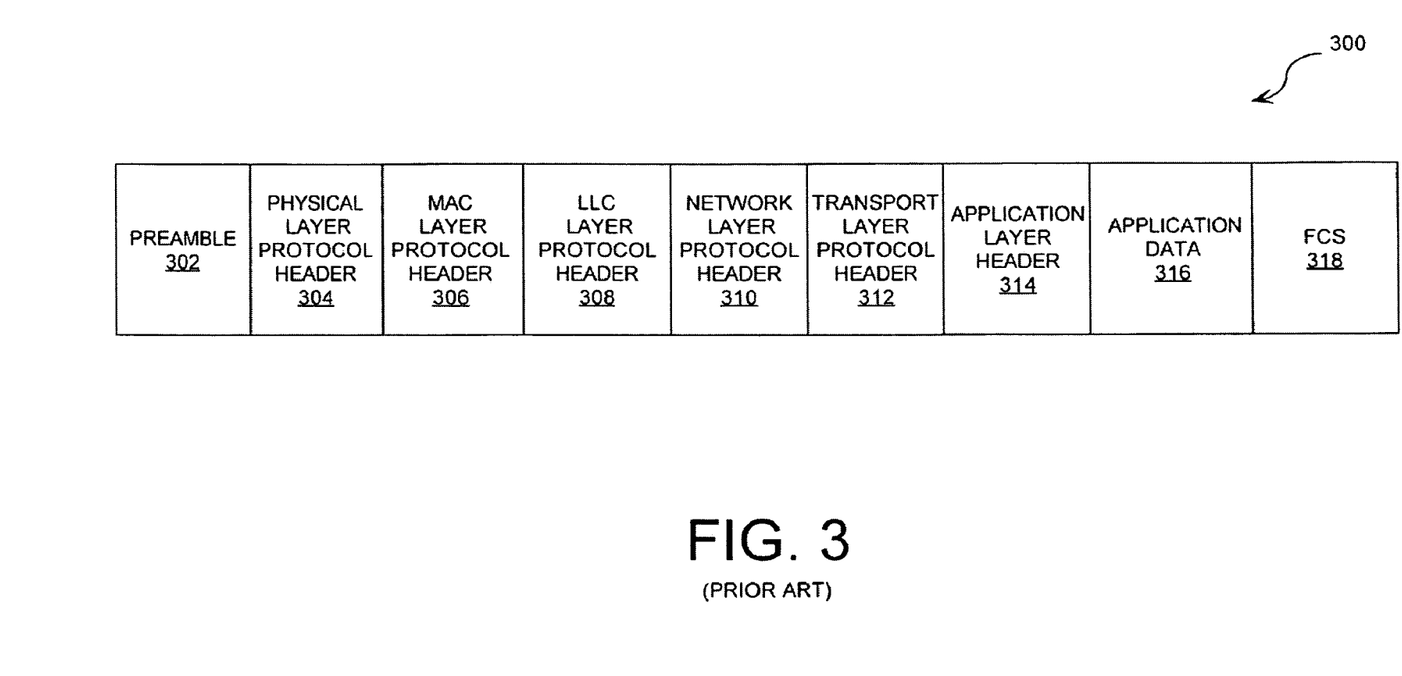
FIG. 3 is a block diagram of a packet that is useful for understanding the present invention.

Referring now to FIG. 3, there is provided a block diagram of a packet 300. As shown in FIG. 3, the packet 300 is comprised of a preamble 302, a physical layer protocol header 304, a media access control (MAC) layer protocol header 306, a logic link control (LLC) layer protocol header 308, a network layer protocol header 310, and a transport layer protocol header 312. The packet 300 is also comprised of an application layer header 314, an application data 316, and a frame check sequence (FCS) 318. The phrase "frame check sequence" as used herein refers to extra checksum characters added to a packet or a frame in a communication protocol for error detection and correction. Each of the listed components of the packet 300 are well known to persons skilled in the art and are well defined in open industry standards of the Institute of Electrical and Electronics Engineers (IEEE) Standard for Local and Metropolitan Area Networks and Internet Engineering Task Force (IEFT). Thus, such components will not be described in detail herein.

However, it should be appreciated that the application data 316 can be signaling protocol data, user data, or management data. The user data can include voice data, video data, or the like. It should also be appreciated that the application data 316 is encapsulated between the application layer header 314 and the frame check sequence (FCS) 318. The application layer header 314 is encapsulated between the transport layer protocol header 312 and the application data 316. Similarly, the transport layer protocol header 312 is encapsulated between the network layer protocol header 310 and the application layer header 314. Likewise, the network layer protocol header 310 is encapsulated between the logic link control (LLC) layer protocol header 308 and transport layer protocol header 312. The logic link control (LLC) layer protocol header 308 is encapsulated between the media access control (MAC) layer protocol header 306 and the network layer protocol header 310. The media access control (MAC) layer protocol header 306 is encapsulated between the physical layer protocol header 304 and the logic link control (LLC) layer protocol header 308. The physical layer protocol header 304 is encapsulated between the preamble 302 and the media access control (MAC) layer protocol header 306.

Figure 4:
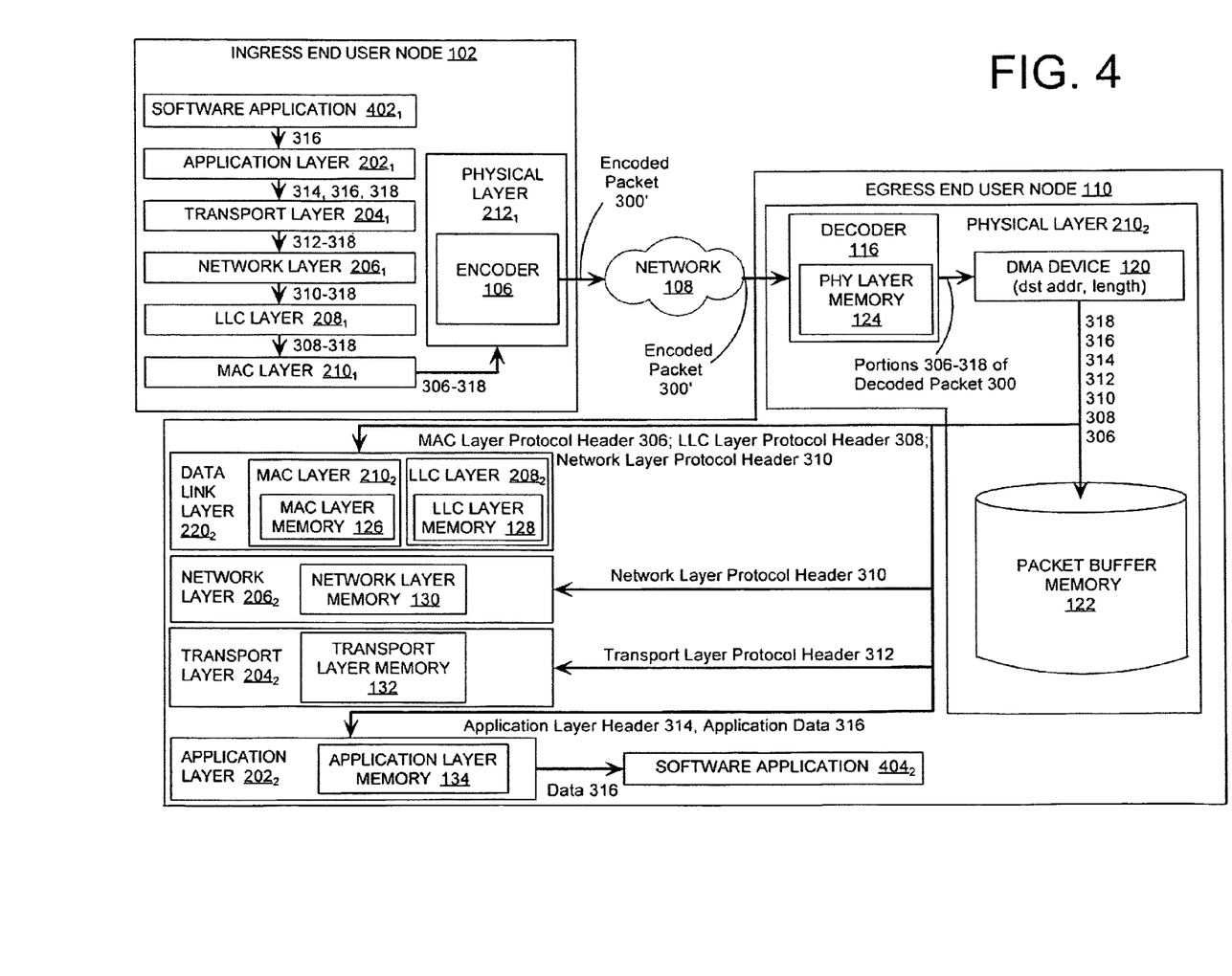
FIG. 4 is a more detailed block diagram of the packet-based communication system in FIG. 1.

Referring now to FIG. 4, there is provided a more detailed block diagram of the packet based communications system of FIG. 1. The block diagram is useful for understanding how application data 316 (described above in relation to FIG. 3) is being transferred from a software application $402_1$ of the IEUN 102 (described above in relation to FIG. 1) to a software application $404_2$ of the EEUN 110 (described above in relation to FIG. 1). In FIG. 4, the application data 316 is generated by the software application $402_1$ and is passed from the software application $402_1$ to an application layer $202_1$ (described above in relation to FIG. 2). The application layer $202_1$ performs action involving encapsulating the application data 316 between an application layer header 314 (described above in relation to FIG. 3) and a frame check sequence (FCS) 318 (described above in relation to FIG. 3). As should be understood, the application layer header 314 includes control information required by an application layer $202_2$ (described above in relation to FIG. 2) in the EEUN 110. The application layer $202_1$ also performs actions involving forwarding the application layer header 314, the application data 316, and the frame check sequence (FCS) 318 to a transport layer $204_1$ (described above in relation to FIG. 2).

The transport layer $204_1$ performs actions involving generating a transport layer protocol header 312 (described above in relation to FIG. 3) and adding the transport layer protocol header 312 to the received information. The transport layer protocol header 312 includes control information required by a transport layer 204$_2$ (described above in relation to FIG. 2) in the EEUN 110. Subsequently, the transport layer 204$_1$ performs actions involving forwarding the information 312, 314, 316, 318 to a network layer 206$_1$ (described above in relation to FIG. 2), and so on down to the physical layer 212$_1$ (described above in relation to FIG. 2). At the physical layer 212$_1$, a preamble 302 (described above in relation to FIG. 3) and a physical layer protocol header 304 (described above in relation to FIG. 3) are generated. The physical layer protocol header 304 is added to the received information such that the received information is encapsulated between the physical layer protocol header 304 and the frame check sequence (FCS) 318. The physical layer also adds the preamble 302 to the encapsulated information thereby forming the packet 300 (described above in relation to FIG. 3). The physical layer 212, performs actions involving placing the packet 300 on a physical medium, encoding the packet 300, and communicating the encoded packet 300' to the network 108.

In turn, the network 108 communicates the encoded packet 300' to a decoder 116 (described above in relation to FIG. 1) of the EEUN 110. Upon receipt of the encoded packet 300', the decoder 116 performs actions to decode the same to obtain a decoded packet 300'. The decoder 116 also performs actions to remove the preamble 302 and the physical layer protocol header 304 from the decoded packet 300. The decoder 116 can further perform actions to forward the preamble 302 and the physical layer protocol header 304 to the physical (PHY) layer memory 124 for storage. Thereafter, the decoder 116 performs actions to communicate a portion of the decoded packet 300 to a DMA device 120 (described above in relation to FIG. 1). In this regard, it should be understood that the portion of the decoded packet 300 includes a media access control protocol header 306 (described above in relation to FIG. 3), a logic link control (LLC) protocol header 308 (described above in relation to FIG. 3), a network layer protocol header 310 (described above in relation to FIG. 3), the transport layer protocol header 312, the application layer header 314, and the application data 316. The portion of the decoded packet 300 may also include the frame check sequence (FCS) 318.

Upon receipt of the portion of the decoded packet 300, the DMA device 120 performs write operations to concurrently write the headers 306, 308, 310, 312, 314, and the application data 316 to the packet buffer memory 122 and a respective layer memory 126, 128, 130, 132, 134. More specifically, the DMA device 120 concurrently performs a plurality of write operations. The write operations include a write operation for concurrently communicating the media access control (MAC) layer protocol header 306 to the packet buffer memory 122 and the media access control (MAC) layer memory 126. The write operations also include a write operation for concurrently communicating the logic link control (LLC) layer protocol header 308 to the packet buffer memory 122 and the logic link control (LLC) layer memory 128. The write operations further include a write operation for concurrently communicating the network layer protocol header 310 to the packet buffer memory 122, the media access control (MAC) layer memory 126, and/or the network layer memory 130. In this regard, it should be understood that the network layer protocol header 310 can be written to the media access control (MAC) layer memory 126 in accordance with certain wireless communication applications. Such applications include, but are not limited to, a bridging application, a routing application, a mobility application, and an Ad-Hoc mesh network application. The write operations include a write operation for concurrently communicating the transport layer protocol header 312 to the packet buffer memory 122 and the transport layer memory 132. The write operations include a write operation for concurrently communicating the application layer header 314 to the packet buffer memory 122 and the application layer memory 134, and so on. Still, the invention is not limited in this regard.

It should be noted that each write operation utilizes two (2) parameters, namely a destination address and a known length of a header 306, 308, 310, 312, 314, and an application data 316. It should also be noted that the write operations are performed to facilitate immediate processing of the headers 306, 308, 310, 312, 314 by a respective protocol stack layer 202$_2$, 204$_2$, 206$_2$, 208$_2$, 210$_2$. It should further be noted that the write operations employed by the DMA device 120 enable concurrent header and/or data processing by each of the protocol stack layers 210$_2$, 208$_2$, 206$_2$, 204$_2$, 202$_2$. As such, the DMA device 120 provides an increased packet processing time feature to the EEUN 110.

Referring again to FIG. 4, each of the protocol stack layers 210$_2$, 208$_2$, 206$_2$, 204$_2$, 202$_2$ can begin processing it's header 306, 308, 310, 312, 314 immediately after storage of the same in a respective memory 126, 128, 130, 132, 134. Methods for processing headers 306, 308, 310, 312, 314 are well known to persons skilled in the art, and therefore will not be described in great detail herein. However, it should be understood that the methods can include, but are not limited to, header validations, header content error checks, field searches, field extractions, and the like. It should also be understood that any such method can be used without limitation.

As shown in FIG. 4, the application layer 202$_2$ is directly connected to the software application 404$_2$. As such, the application layer 202$_2$ is configured to receive the application data 316 from the DMA device 120 and communicate the same to the software application 404$_2$.

It should be noted that the above described EEUN 110 configuration differs from conventional EEUN configurations. An example of a conventional EEUN configuration is provided in FIG. 5 that is useful for understanding how the inventive arrangements differ from conventional EEUN configurations.

Figure 5:
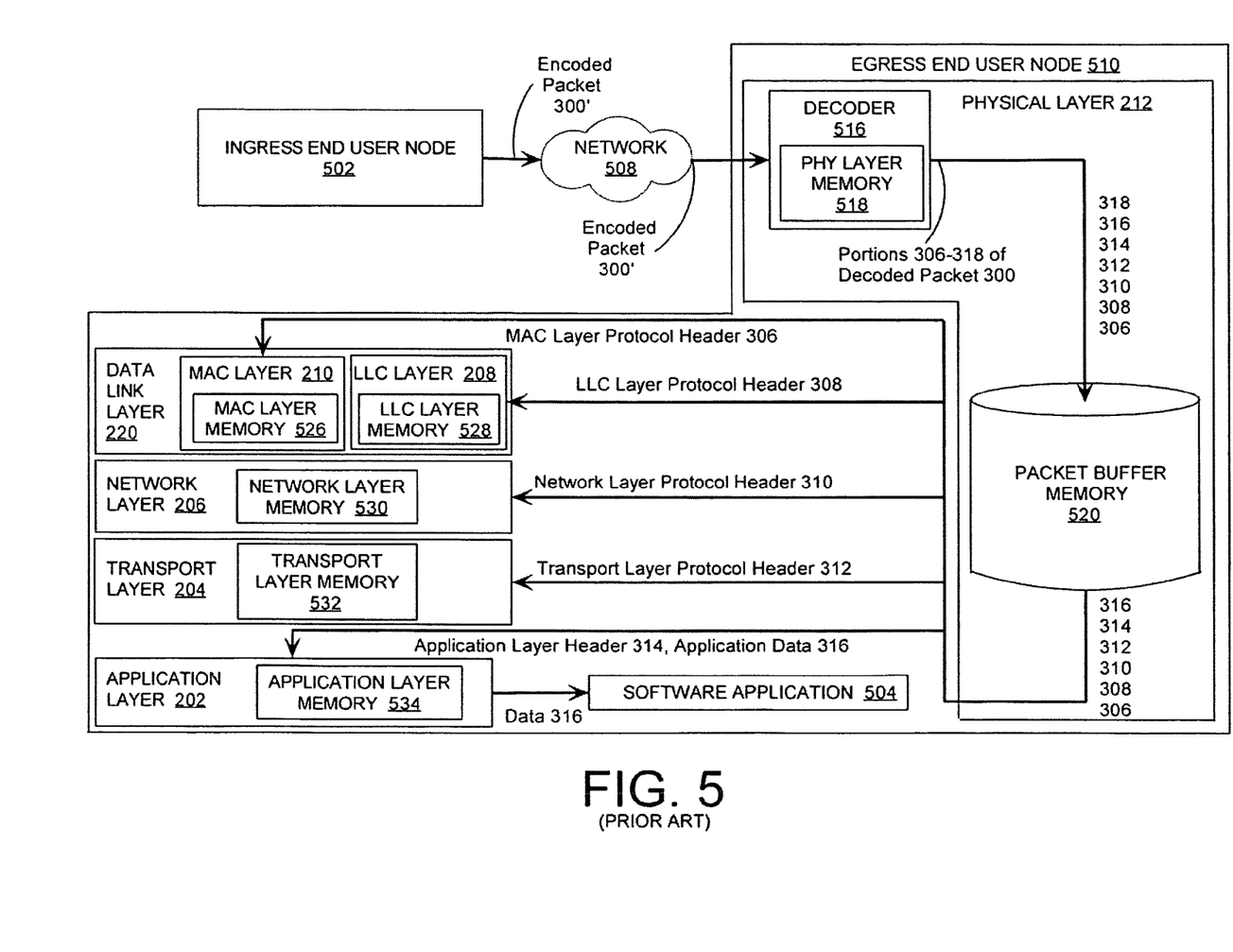
FIG. 5 is a schematic illustration of a conventional egress end user node (EEUN) configuration that is useful for understanding how the inventive arrangements differ from conventional EEUN configurations.

Referring now to FIG. 5, an encoded packet 300' is communicated from an IEUN 502 to an EEUN 510. Upon receipt of the encoded packet 300', a decoder 516 performs actions to decode the same. The decoder 516 also performs actions to forward a portion of a decoded packet 300 that is absent of a preamble and physical layer information to a packet buffer memory 520.

Thereafter, each protocol stack layer processes it's respective layer information in a sequential manner. For example, the decoder 516 notifies the media access control (MAC) layer 210 when the portion of the decoded packet 300 is stored in the packet buffer memory 520. Upon being notified, the media access control (MAC) layer 210 performs actions to access the packet buffer memory 520, retrieve the media access control (MAC) layer protocol header 306 therefrom, and store the media access control (MAC) layer protocol header 306 in a media access control (MAC) layer memory 526. The media access control (MAC) layer 210 also performs actions to process the media access control (MAC) layer protocol header 306. Upon completion of the media access control (MAC) layer protocol header 306 processing, the media access control (MAC) layer 210 communicates a notification to the logic link control (LLC) layer 208.

In response to the notification, the logic link control (LLC) layer 208 performs actions to access the packet buffer memory 520, retrieve a logic link control (LLC) layer protocol header 308 therefrom, and store the logic link control (LLC) layer protocol header 308 in a logic link control (LLC)

layer memory 528. The logic link control (LLC) layer also performs actions to process the logic link control (LLC) layer protocol header 308. Upon completion of the logic link control (LLC) layer protocol header 308 processing, the logic link control (LLC) layer 208 communicates a notification to the network layer 206, and so on, until the application layer 202 is reached.

Finally, the application layer 202 performs actions to access the packet buffer memory 520, retrieve an application layer header 314 therefrom, and store the application layer header 314 in an application layer memory 534. The application layer 202 also performs actions to process the application layer header 314. The application layer 202 further performs actions to access the packet buffer memory 520, retrieve an application data 316 therefrom, and forward the same to the software application 504.

As should be understood, the EEUN 510 configuration of FIG. 5 is the most efficient of conventional configurations. Other conventional EEUN configurations include two or more separate packet buffer memories. Typically, the packet buffer memories are segregated by protocol stack 200 layers. For example, an EEUN configuration includes a first packet buffer memory for the physical layer 212, the medium access control (MAC) layer 210 and the logic link control (LLC) layer 208. The EEUN configuration includes a second buffer memory for the network layer 206 and the transport layer 204. The EEUN configuration includes a third packet buffer memory for the application layer 202 and the software application 504. In such a scenario, the entire packet 300 is copied to a new packet buffer memory when each group completes its respective header 304, 306, 308, 310, 312, 314 processing. One can appreciate that the conventional EEUN configurations has a significantly greater protocol header processing time as compared to the EEUN configuration 400 (described above in relation to FIG. 4).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for processing a packet at an egress end user node, comprising:
   decoding a packet having a plurality of headers; and
   subsequent to said decoding step, concurrently writing (1) each of said plurality of headers to a packet buffer memory and (2) each individual one of said plurality of headers to a respective protocol stack layer memory where it is available for immediate processing within a protocol stack layer.

2. The method according to claim 1, wherein at least one of said plurality of headers is a media access control layer protocol header and said respective protocol stack layer memory is a media access control layer memory.

3. The method according to claim 1, wherein at least one of said plurality of headers is a logic link control layer protocol header and said respective protocol stack layer memory is a logic link control layer memory.

4. The method according to claim 1, wherein at least one of said plurality of headers is a network layer protocol header and said respective protocol stack layer memory is a media access control layer memory.

5. The method according to claim 1, wherein at least one of said plurality of headers is a network layer protocol header and said respective protocol stack layer memory is a network layer memory.

6. The method according to claim 1, wherein at least one of said plurality of headers is a transport layer protocol header and said respective protocol stack layer memory is a transport layer memory.

7. The method according to claim 1, wherein at least one of said plurality of headers is an application layer header and said respective protocol stack layer memory is an application layer memory.

8. The method according to claim 1, further comprising concurrently processing said plurality of headers in each of a plurality of protocol stack layers.

9. The method according to claim 1, further comprising communicating a portion of said packet to a direct memory access (DMA) device subsequent to said decoding step and prior to said concurrently writing step.

10. The method according to claim 9, wherein said portion is absent of a preamble and a physical layer header.

11. The method according to claim 1, further comprising following said decoding step, communicating a physical layer header to a physical layer memory where it is available for immediate processing within a physical layer.

12. The method according to claim 1, wherein said concurrently writing step is performed within a physical layer utilizing a direct memory access (DMA) device.

13. An egress end user node (EEUN) of a packet based communications system, comprising:
   a decoder configured for decoding a packet having a plurality of headers; and
   a direct memory access (DMA) device coupled to said decoder and configured for concurrently writing (1) each of said plurality of headers to a packet buffer memory and (2) each individual one of said plurality of headers to a respective protocol stack layer memory where it is available for immediate processing within a protocol stack layer.

14. The EEUN according to claim 13, wherein at least one of said plurality of headers is a media access control layer protocol header and said respective protocol stack layer memory is a media access control layer memory.

15. The EEUN according to claim 13, wherein at least one of said plurality of headers is a logic link control layer protocol header and said respective protocol stack layer memory is a logic link control layer memory.

16. The EEUN according to claim 13, wherein at least one of said plurality of headers is a network layer protocol header and said respective protocol stack layer memory is a media access control layer memory.

17. The EEUN according to claim 13, wherein at least one of said plurality of headers is a network layer protocol header and said respective protocol stack layer memory is a network layer memory.

18. The EEUN according to claim 13, wherein at least one of said plurality of headers is a transport layer protocol header and said respective protocol stack layer memory is a transport layer memory.

19. The EEUN according to claim 13, wherein at least one of said plurality of headers is an application layer header and said respective protocol stack layer memory is an application layer memory.

20. The EEUN according to claim 13, wherein said decoder is further configured for communicating a portion of said packet to said DMA device subsequent to decoding said packet.

21. The EEUN according to claim 20, wherein said portion is absent of a preamble and a physical layer header.

22. The EEUN according to claim 13, wherein said decoder is further configured for communicating a physical layer header to a physical layer memory where it is available for immediate processing within a physical layer subsequent to decoding said packet.

* * * * *